US012301638B1

(12) United States Patent
Hutto et al.

(10) Patent No.: US 12,301,638 B1
(45) Date of Patent: May 13, 2025

(54) IDENTIFYING RELEVANT CONTENT FOR VIDEO CONFERENCES

(71) Applicant: Zoom Video Communications, Inc., San Jose, CA (US)

(72) Inventors: Ronald Hutto, Willis, TX (US); Gavin Paxton, Magnolia, TX (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/202,540

(22) Filed: May 26, 2023

(51) Int. Cl.
*H04L 65/1089* (2022.01)
*H04L 65/1093* (2022.01)

(52) U.S. Cl.
CPC ...... *H04L 65/1089* (2013.01); *H04L 65/1093* (2013.01)

(58) Field of Classification Search
CPC .................. H04L 65/1089; H04L 65/1093
See application file for complete search history.

(56) References Cited

U.S. PATENT DOCUMENTS

| | | | |
|---|---|---|---|
| 2010/0105454 A1* | 4/2010 | Weber ............... | H04L 67/53 463/1 |
| 2020/0293605 A1* | 9/2020 | Nelson ............... | G06N 20/00 |
| 2020/0403817 A1 | 12/2020 | Daredia et al. | |
| 2021/0092168 A1 | 3/2021 | Ranalli et al. | |
| 2021/0375289 A1 | 12/2021 | Zhu et al. | |
| 2022/0109585 A1 | 4/2022 | Asthana et al. | |
| 2022/0254348 A1 | 8/2022 | Tay et al. | |
| 2022/0353468 A1* | 11/2022 | Walia ............... | G16H 80/00 |
| 2023/0261890 A1 | 8/2023 | Religa et al. | |

OTHER PUBLICATIONS

U.S. Appl. No. 18/202,540 , "U.S. Patent Application No.", filed May 26, 2023, 119 pages.
U.S. Appl. No. 18/202,544 , "Final Office Action", Oct. 23, 2024, 12 pages.
U.S. Appl. No. 18/202,544 "Non-Final Rejection," Jun. 12, 2024, 19 pages.
U.S. Appl. No. 18/202,544, "Filed US Application," filed May 26, 2023, 119 Pages.

* cited by examiner

*Primary Examiner* — El Hadji M Sall
(74) *Attorney, Agent, or Firm* — Kilpatrick Townsend & Stockton LLP

(57) ABSTRACT

Techniques for identifying content in video conferences and virtual meetings are disclosed. In an example, a method involves establishing a virtual meeting and client devices to the virtual meeting. Each client device is associated with a corresponding participant. The method further involves accessing a data store having available multimedia content items. The method further involves selecting, based on metadata associated with the virtual meeting, from multimedia content items in the data store, a multimedia content item that is relevant to the virtual meeting. The method further involves transmitting the selected multimedia content item to one or more of the client devices.

20 Claims, 11 Drawing Sheets

SUMMARY 1000

TITLE 1010

DATE AND TIME 1020

PARTICIPANTS 1030

TOPICS DISCUSSED 1040

NEXT STEPS 1050

*FIG. 10*

IDENTIFYING RELEVANT CONTENT FOR VIDEO CONFERENCES

FIELD

This disclosure generally relates to video conferencing. More specifically, but not by way of limitation, this disclosure relates to identifying relevant content for videoconferences.

BRIEF DESCRIPTION OF THE DRAWINGS

FIG. 10 illustrates an example of a meeting summary.

DETAILED DESCRIPTION

Disclosed techniques relate to video conferencing, and more specifically to content of video conferences. Video conferences and virtual meetings are in widespread use in businesses, schools, and by individuals. Content, such as documents, videos, and multimedia can often be relevant or helpful before, during, or after a meeting.

For example, meetings can be more productive and useful if relevant content is provided to participants who are waiting for a meeting to begin or who are in the meeting. Other times, during a meeting, a particular issue or topic may arise that can be addressed by available content. But often, such content is not readily accessible for sharing, rendering the meeting less useful to its participants.

Existing video conferencing solutions are unable to automatically identify relevant content. For instance, some existing solutions simply place stock images or videos in a waiting room of a meeting. By contrast, disclosed techniques can use machine-learning to identify relevant content for video conferences and provide the identified content at an appropriate time. For instance, a trained machine-learning model can determine, from a data store, relevant content for a particular meeting based on metadata associated with the meeting. Examples of metadata include names and job titles of participants or an identity of a person scheduling the meeting, a title, time, or date of the meeting, a description of the meeting, and past feedback on relevant content.

The following non-limiting example is introduced for discussion purposes. A conference is scheduled between various participants. Before the conference starts, the machine-learning model receives metadata associated with the meeting. Based on the metadata, the machine-learning model identifies, from a data store, items of content that are relevant to the meeting. The conference is established, via the conference provider, between client devices, each of which corresponds to a participant. The video conference provider then presents identified content before a conference (e.g., in a waiting room), during a conference, or after a conference.

Figure 1:
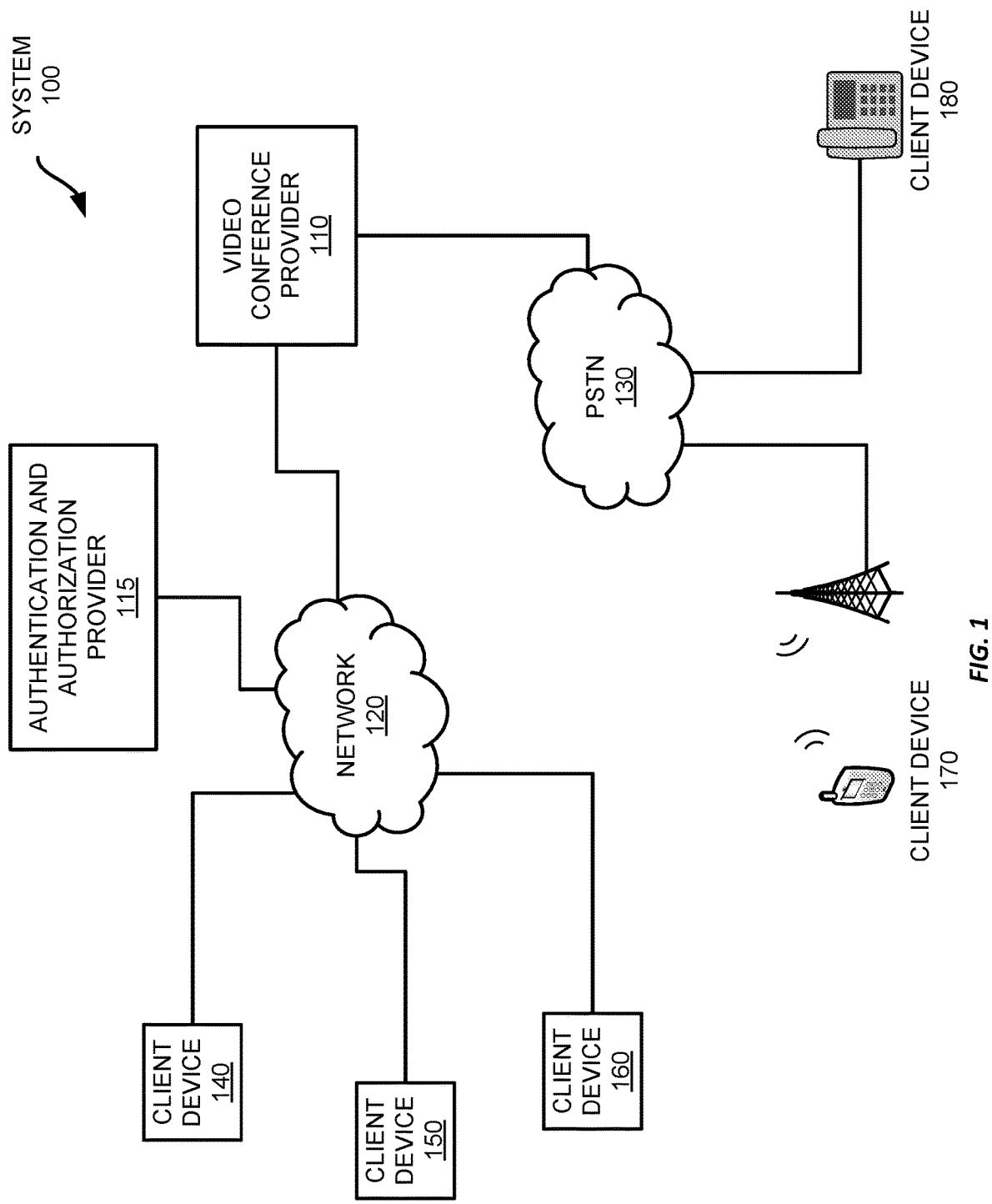
FIG. 1 depicts an example system for providing videoconferencing functionality to client devices.

Referring now to FIG. 1, FIG. 1 shows an example, system 100, that provides video conferencing functionality to various client devices. The system 100 includes a chat and video conference provider 110 that is connected to multiple communication networks 120, 130, through which various client devices, 140-180, can participate in video conferences hosted by the chat and video conference provider 110. For example, the chat and video conference provider 110 can be located within a private network to provide video conferencing services to devices within the private network, or it can be connected to a public network (e.g., the internet) so it may be accessed by anyone. Some examples may even provide a hybrid model in which a chat and video conference provider 110 may supply components to enable a private organization to host private internal video conferences, or to connect its system to the chat and video conference provider 110 over a public network.

The system optionally also includes one or more authentication and authorization providers (e.g., authentication and authorization provider 115) which can provide authentication and authorization services to users of the client devices 140-160. Authentication and authorization provider 115 may authenticate users to the chat and video conference provider 110, and manage user authorization for the various services provided by chat and video conference provider 110. In this example, the authentication and authorization provider 115 is operated by a different entity than the chat and video conference provider 110, though in some examples, they may be the same entity.

Figure 2:
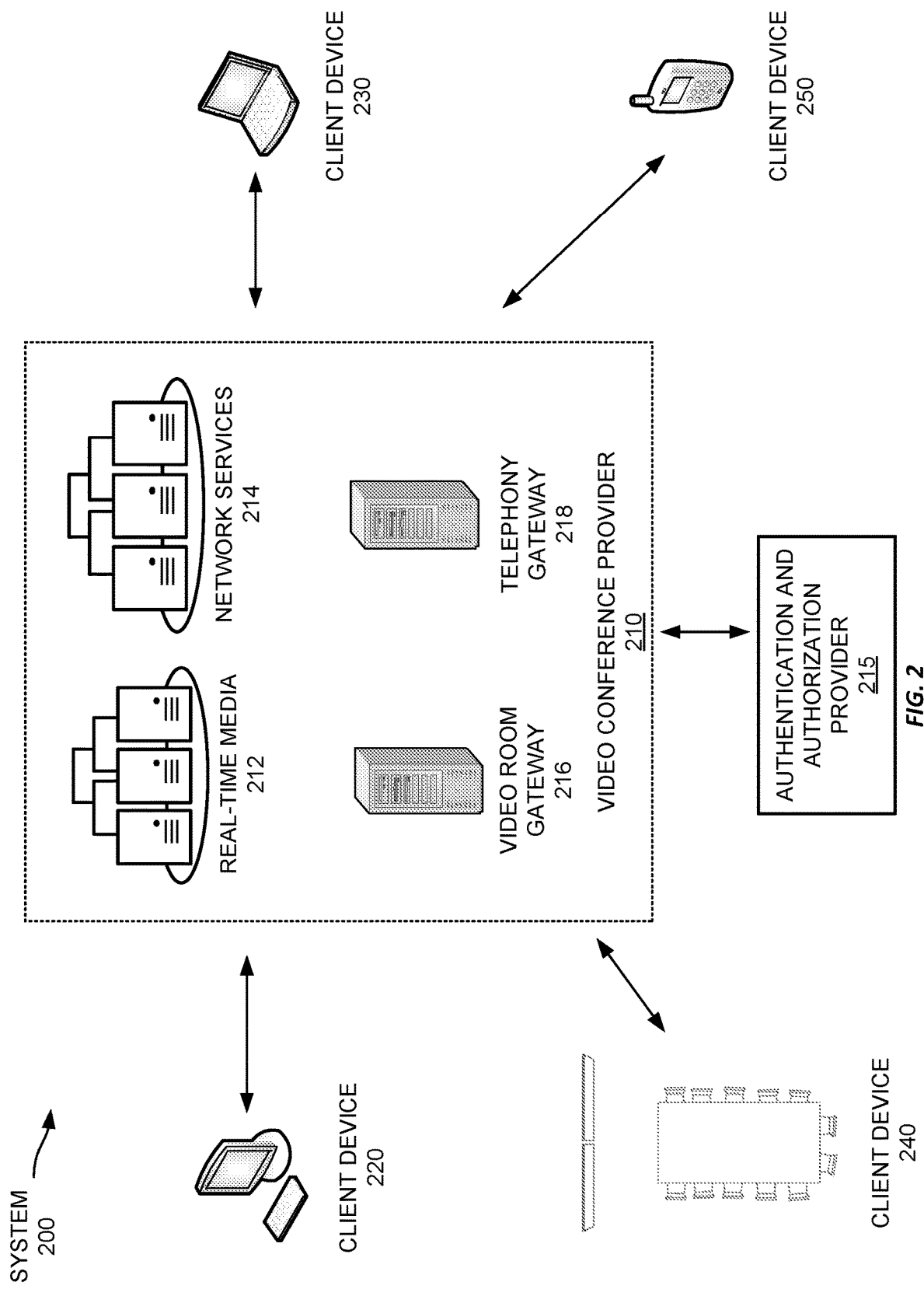
FIG. 2 depicts an example system in which a video conference provider provides videoconferencing functionality to various client devices.

Chat and video conference provider 110 allows clients to create video conference meetings (or "meetings") and invite others to participate in those meetings, as well as perform other related functionality, such as recording the meetings, generating transcripts from meeting audio, generating summaries and translations from meeting audio, manage user functionality in the meetings, enable text messaging during the meetings, create and manage breakout rooms from the virtual meetings, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common video conference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls (e.g., using a headset and microphone). Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120, and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device (e.g., client devices 140-160) may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality, such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices (e.g., client devices 170-180) the user may place a telephone call to the chat and video conference provider 110 to access video conference services. After the call is answered, the user may provide information regarding a video conference meeting (e.g., a meeting identifier ("ID"), a passcode or password, etc.) to allow the telephony device to join the meeting and participate using audio devices of the telephony device (e.g., microphone(s) and speaker(s)), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information (e.g., a meeting identifier and passcode) but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110, or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides video conferencing functionality to client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210, generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateway servers 218. Each of these servers 212-218 is connected to one or more communications networks to enable them to collectively provide access to and participation in one or more video conference meetings to the client devices 220, 230, 240, and 250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240, and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory, and network I/O as well as network parameters such as packet loss, latency, and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities (e.g., client device 250), the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers, e.g., cloud recording servers) for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting, and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises (e.g., at a business or other organization). For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure (e.g., internet backbone network(s)) that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy (e.g., for specific regions or localities) to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to the network services servers 214. The client device may then provide access credentials for a user (e.g., a username and password or single sign-on credentials) to gain authenticated access to the chat and video conference provider 210.

This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214, but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate (e.g., by deleting a corresponding passcode for the meeting from the meeting record) or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones, and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Telephony gateway servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device (e.g., by sending dual-tone multi-frequency ("DTMF") audio streams to the telephony gateway server 218). The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device (e.g., a microphone and speaker) for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
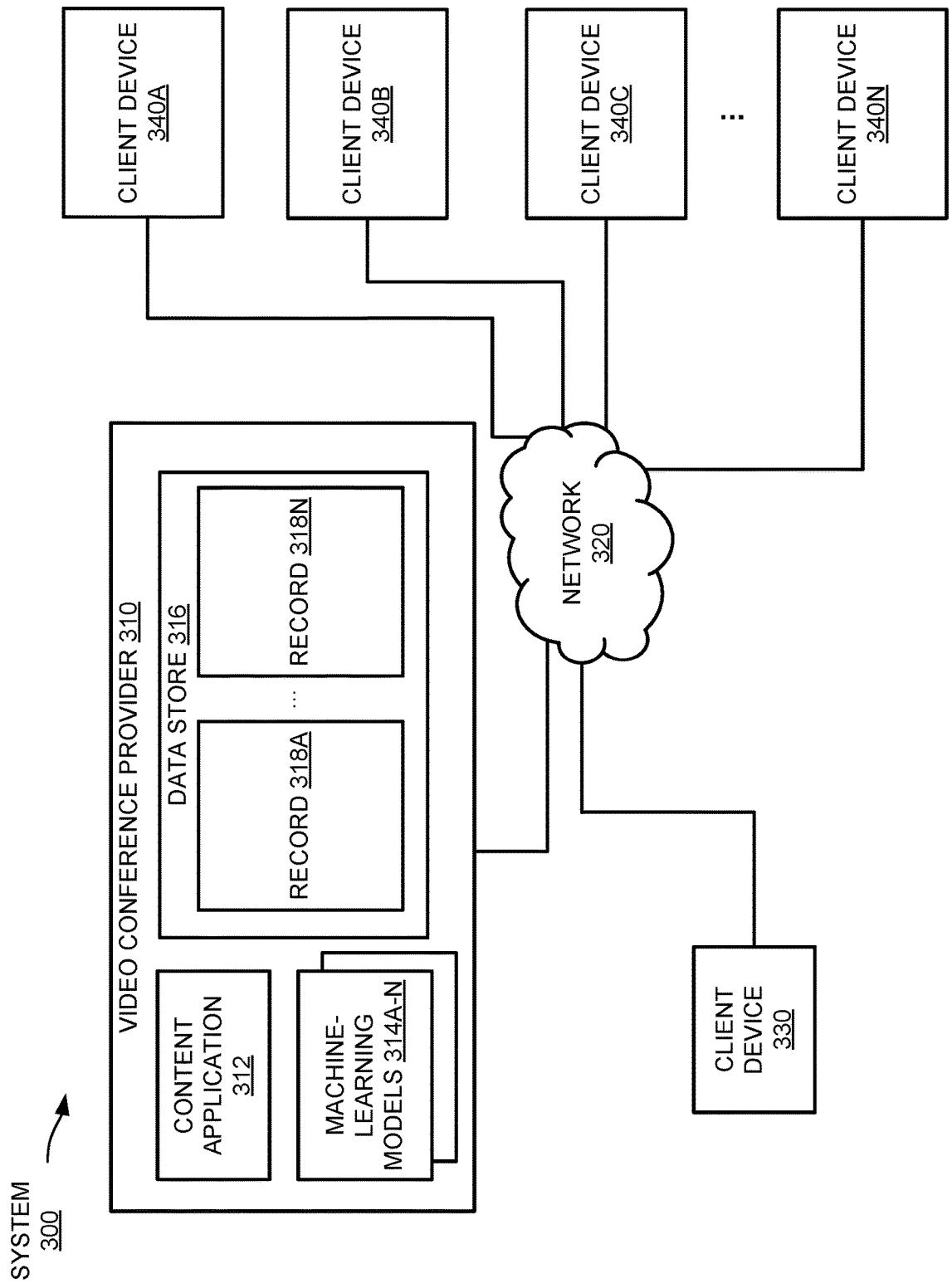
FIG. 3 depicts an example system for identifying relevant content for videoconferences.

FIG. 3 depicts an example system 300 for identifying relevant content for videoconferences. The system 300 shown in FIG. 3 includes a video conference provider 310 and multiple client devices 330 and 340A-N that are connected to the video conference provider 310 via network 320. In this example, the network 320 is the internet; however, any communications network or combination of communications networks may be employed. While system 300 is depicted as including multiple client device 330, 340A-N, it should be appreciated that some systems may not include any client devices at any particular time, and that the number of client devices can change.

To start a video conference, client device 330, a host, connects to the video conference provider 310 and begins a main meeting ("meeting") at the video conference provider 310, such as by beginning a scheduled meeting, generally as described above with respect to FIGS. 1 and 2. The video conference provider 310 may create and manage the meeting as discussed above with respect to FIGS. 1-2. Any of client devices 330 or 340A-N may start or join additional meetings.

Video conference provider 310 can perform content-related actions such as content identification or meeting summarization. As depicted, video conference provider 310 includes content application 312, one or more machine-learning models 314A-N, and data store 316. Content application 312 can manage meeting content. For example, content application 312 can identify, from metadata of a conference, content relevant to the conference. Content application 312 can then share the identified content during the conference. Content application 312 can also generate a meeting summary from meeting content and other content. For instance, content application 312 can analyze content shared before, during, or after a meeting; content otherwise relevant to the meeting; audiovisual streams from the participants; and/or chat messages from the participants and generate a meeting summary therefrom.

Machine learning can be used in some aspects. Each machine-learning model 314A-N can be trained to identify content, extract relevant information therefrom, and/or perform ancillary operations such as speech-to-text or optical character recognition. For instance, a first machine-learning model 314A can identify a particular content item from a data store that is relevant to a particular set of keywords or metadata. A second machine-learning model 314B can extract, from an item of content, audiovisual streams, and/or chat messages, one or more items to be included in a meeting summary.

Each machine-learning model 314A-N can work together or separately to perform the functionality described herein. Each model can be separately trained for different purposes and be dynamically selected and used as appropriate. For instance, machine-learning model 314C can be trained to identify relevant multimedia, whereas machine-learning model 314D can be trained to identify relevant documents, and so forth.

Each machine-learning model 314A-N can be trained using supervised training, unsupervised training, or other approaches. For example, in supervised learning, a machine-learning model is trained with training data that includes labels representing an ideal prediction. Predictions or classifications of the machine-learning model are compared to training labels. One or more parameters of the machine-learning model are then updated based on the comparison. In this manner, the machine-learning model improves over iterations of training. In some cases, training can be performed for different keywords or sets of keywords. Examples of suitable machine-learning models include support vector machines (SVNs), logistic regressions, naive Bayes classifiers, and random forests.

Data store 316 can store one or more items of content. The items of content can originate from any source. For instance, an item of content can be identified as relevant to a meeting but never have been previously shared, or an item of content can be selected by a meeting administrator.

Figure 4:
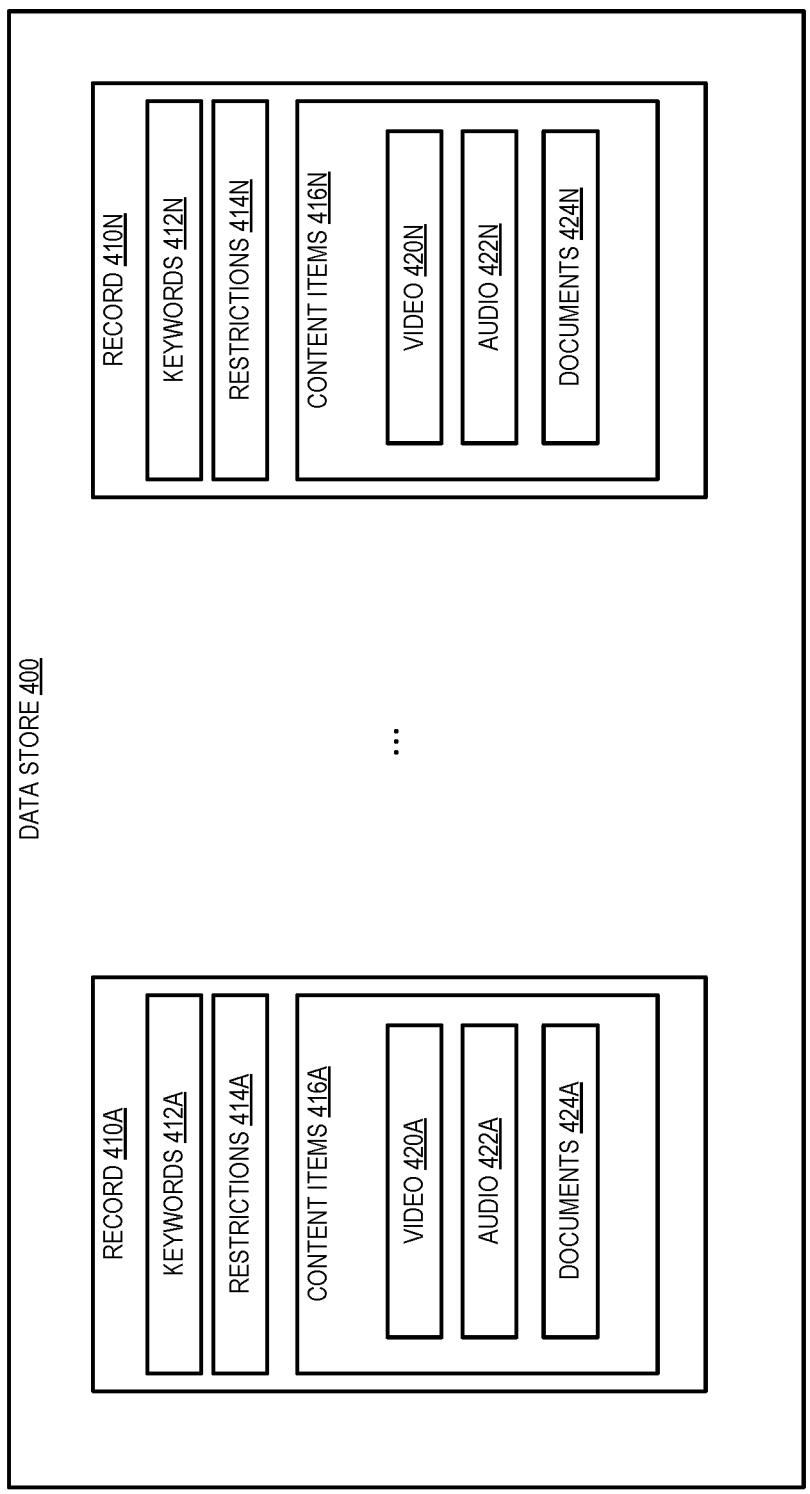
FIG. 4 depicts an example data store for storing relevant content for videoconferences.

Data store 316 includes records 318A-N. Each record 318A-N can include metadata and/or keywords that relate to the particular record. The metadata and keywords can be used to assess a relevancy of an item of content including a more detailed contents of the item of content. Each record 318A-N can also have one or more content items, which include documents, audio, and/or video. FIG. 4 discusses an example of a data store in more detail.

FIG. 4 depicts an example data store for storing relevant content for videoconferences. Data store 400 includes one or more records 410A-N. As depicted in data store 400, each record 410A-N can include keywords, restrictions, and content items. Examples of content items include video, audio, and documents. For instance, record 410A includes keywords 412A, restrictions 414A, and content items 416A.

Each keyword can be relevant to or associated with a corresponding content item 416A-N. A keyword can be updated, for example, to correct sub-optimum searches or errors. In some cases, a keyword is predetermined. In other cases, a user can provide a keyword to be used. Examples of keywords include type of content (e.g., audio, video, etc.), keywords identifying a particular opportunity, keywords identifying an individual participant.

In an aspect, content items in specific records can be restricted to certain individuals, meetings, and so forth. As such, each record 318A-N can include a corresponding restriction 414A-N, which can enable and/or restrict the content from being identified and subsequently used with respect to certain users or participants.

As depicted, content items 416A includes video 420A, audio 422A, documents 424A, and so forth. But other content items are possible. For example, content can also include video or audio extracted from one or more conference sessions or recordings of conference sessions.

The content stored in data store 400 can be adjusted. For example, content can be added to or removed from data store 400. Content can be pre-populated for example, at the start of a meeting. New content can be automatically indexed for relevant keywords and/or receive keywords from an administrator.

Figure 5:
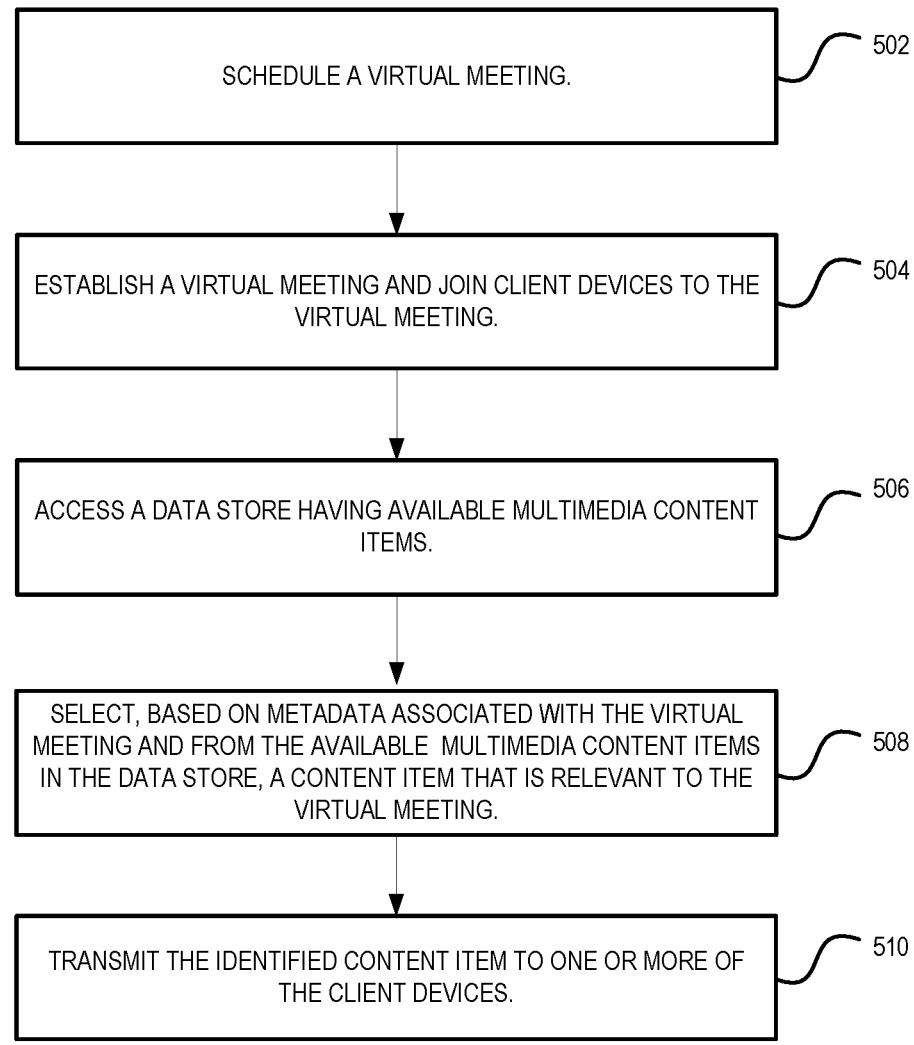
FIG. 5 depicts a flowchart of an example of a method for identifying relevant content for videoconferences.

FIG. 5 depicts a flowchart of an example of a method for identifying relevant content for videoconferences. Method 500 can be implemented by one or more of video conference provider 310, client devices 340A-N, or any other suitable systems. For example purposes, FIG. 5 is discussed with respect to FIG. 3.

It should be appreciated that method 500 provides a particular method for identifying relevant content for videoconferences. Other sequences of operations may also be performed according to alternative examples. For example, alternative examples may perform the operations outlined above in a different order. Moreover, the individual operations illustrated by method 500 may include multiple sub-operations that may be performed in various sequences as appropriate to the individual operation. Furthermore, additional operations may be added or removed depending on the particular applications. Further, the operations described in method 500 may be performed by different devices.

At block 502, method 500 involves scheduling a virtual meeting. The virtual meeting can be scheduled by a host, moderator, participant, non-participant, or other individual Upon scheduling, various metadata related to the meeting can be received at video conference provider 310 (and/or the authentication and authorization provider 115) and is passed to the content application 312 for analysis.

A scheduling of a meeting can inherently have some metadata. For instance, scheduling a meeting involves the names and/or email addresses of one or more participants of the meeting, a title of the meeting, and a subject of the meeting. But other metadata may be optionally provided by the individual scheduling the meeting. For example, upon scheduling, the information about the meeting can be added such as the companies represented in the meeting, the names of products and types of issues to be discussed, the estimated sales opportunity, and so forth. This additional metadata can also be used to identify relevant content.

At scheduling time, some content items may be available for selection. These items may be found in a meeting resource tab within the meeting controls. The meeting controls can be assigned to or limited to designated roles such as a host or administrator. But additional content such as documents, multimedia, or website links can be provided. This content can be automatically selected as available by the individual scheduling the meeting. An example of a graphical user interface (GUI) used to add resources is discussed with respect to FIG. 6.

Figure 6:
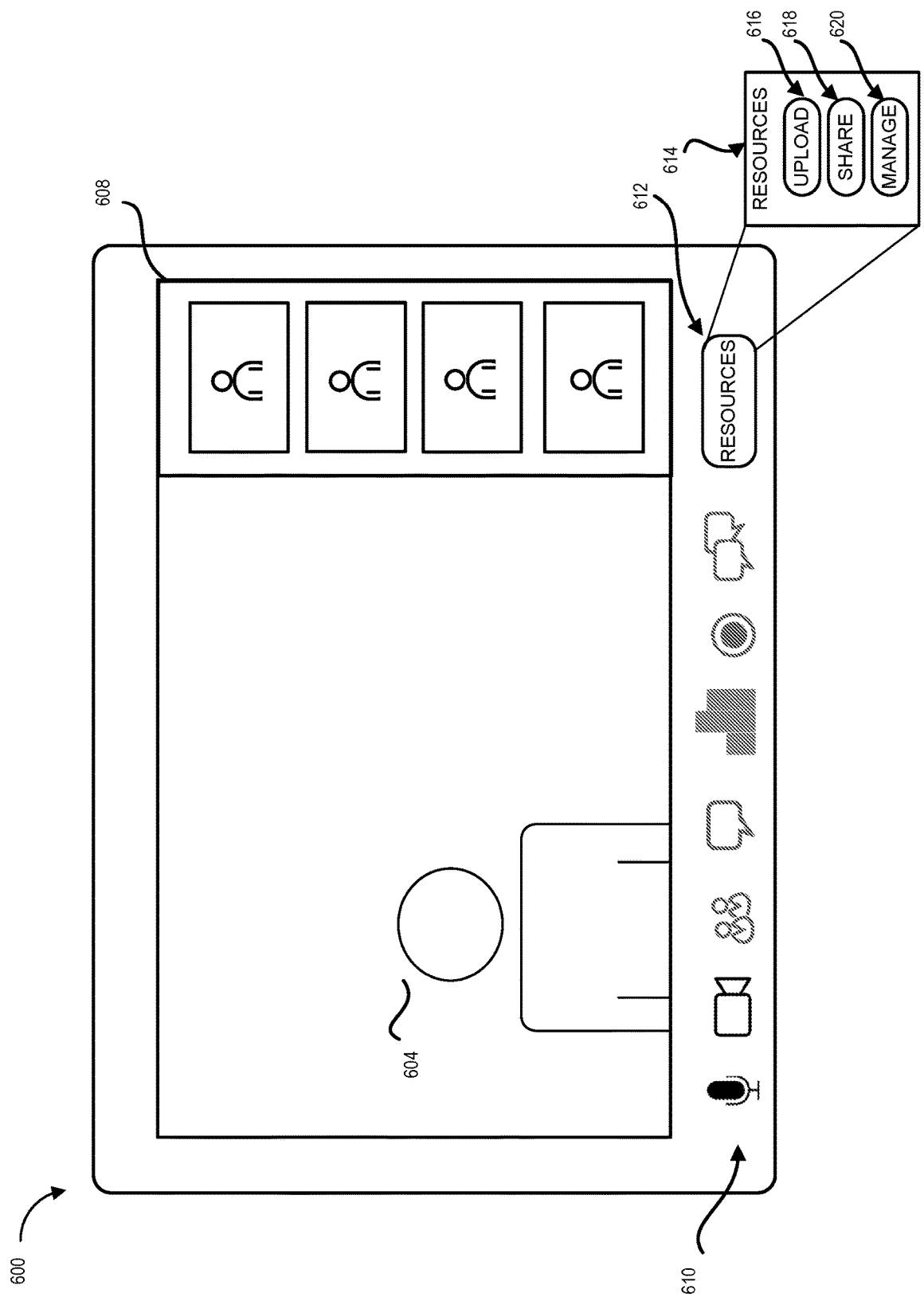
FIG. 6 depicts an example of a Graphical User Interface (GUI) of a video conference including resource selection.

FIG. 6 depicts an example of a Graphical User Interface (GUI) 600 of a video conference including resource selection. GUI 600 can be used on any client device viewing and selecting resources for use in a conference.

GUI 600 depicts participant 604, indication 608, and meeting controls 610. Participant 604 is a currently-selected participant, which can be a participant corresponding to the client device on which GUI 600 is displayed, or another selected participant, for instance, the participant that is currently active or speaking. Indication 808 depicts different conference participants.

Meeting controls 610 include resources button 612, which causes resources panel 614 to be visible. Resources panel 614 includes upload button 616, share button 618, and manage button 620. The meeting controls can be used at any time before, during, or after the meeting. Upload button 616 allows a moderator to select one or more items of content for upload into a data store. From there, the content can be indexed and analyzed. Share button 618 allows a user to select one or more content items for use during a meeting. For example, when selected, a content item will be used in the meeting, overriding any determination by content application 312. Manage button 620 allows a user to made modifications to content in a data store, such as removing a particular item of content or updating permissions on a particular item of content.

Returning to FIG. 5, at block 504, method 500 involves establishing a virtual meeting and joining client devices to the virtual meeting. Video conference provider 310 establishes a meeting between one or more of client devices 340A-N. Each client device is associated with a corresponding participant or resource (e.g., meeting room).

In some cases, when the meeting is established, participants join the main conference automatically. In other cases, the meeting is established but participants join a waiting room until the meeting commences. In yet other sessions, different sub-meetings or breakout sessions are used.

In some cases, the content is selected before the meeting starts. Therefore, in this case, block 504 executes later in method 500.

At block 506, method 500 involves accessing a data store having available multimedia content items. For example, video conference provider 310 accesses data store 316, which includes records 318A-N. As discussed with respect to FIGS. 3 and 4, a data store can include a record for each content item. Each record item can include additional information such as keywords that relate to the content item and/or restrictions that restrict access to the content item.

In some cases, data store 316 is local to a server other than the video conference provider 310. In other cases, a data store that is local to a client device can be used.

At block 508, method 500 involves selecting, based on metadata associated with the virtual meeting and from the multimedia content items in the data store, a multimedia content item that is relevant to the virtual meeting. Content application 312 selects a content item. Keyword, machine learning, or other approaches can be used.

In some aspects, keyword-based approaches are used to identify relevant content from data store 316. For example, keywords can be extracted from the meeting metadata. Then, matching keywords in one or more records in data store 316 can be identified from the keywords of the one or more records in data store 316.

In other aspects, machine-learning model 314 is used to identify relevant content from data store 316. Content application 312 can provide metadata and/or keywords extracted from the metadata to machine-learning model 314. Machine-learning model 314 receives as input one or more items of metadata. In turn, machine-learning model 314 outputs a prediction or classification of one or more suitable items of content.

For example, machine-learning model 314 can identify one or more of an item of content that is a best-fit, two or more items of content, and so forth. In some cases, machine-learning model 314 outputs a ranking of items of content. For example, the ranking can include an identification of a first item of content with an 80% confidence of relevancy, an identification of a second item of content with a 71% confidence of relevancy, etc.

Based on the output from machine-learning model 314, content application 312 accesses the identified relevant items of content one or more records in the data store 316. Then then content application 312 accesses the corresponding content item from the record.

Figure 7:
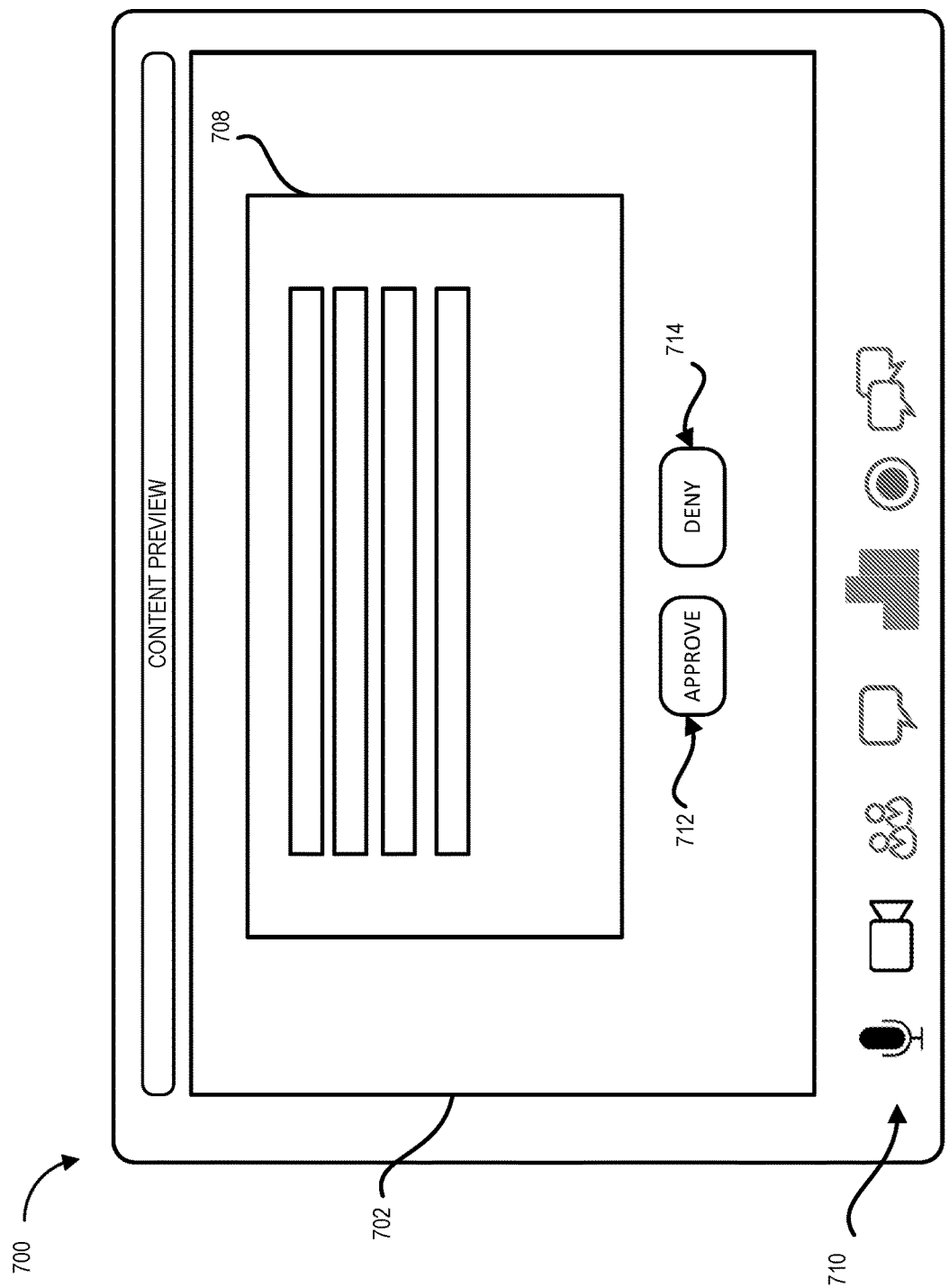
FIG. 7 depicts an example of a Graphical User Interface (GUI) of a video conference showing a content moderation view.

Video conference provider 310 can present the identified content to one or more client devices 330 and/or 340A-N for display before, during, or after the meeting. In some cases, content is presented to a moderator, administrator, or host for approval prior to being included in the conference. Accordingly, in some aspects, the video conference provider 310 presents an indication of the identified multimedia content item on a user interface. FIG. 7 illustrates an example of a content preview interface with facilities to approve or deny a particular item of content.

FIG. 7 depicts an example of a Graphical User Interface (GUI) of a video conference showing a content preview. GUI 700 can be used on any client device viewing and selecting resources for use in a conference. GUI 700 depicts window 702, conference controls 710, approve button 712, and deny button 714. Window 702 includes content preview 708. Content preview 708 allows a designated user (e.g., a moderator, host, or scheduler) to view one or more items of content selected by content application 312 and/or machine-learning model 314. The moderator, administrator, or host can approve the content item using approve button 712 or deny the content item by pressing deny button 714. If video conference provider 310 receives an approval via the user interface, then method 500 proceeds to block 510.

Returning to FIG. 5, at block 510, method 500 involves transmitting the selected multimedia content item to one or more of the client devices. In some cases, transmitting can include providing a video or audio stream associated with the selected multimedia content item to the client device. The client device then presents the content item.

Figure 8:
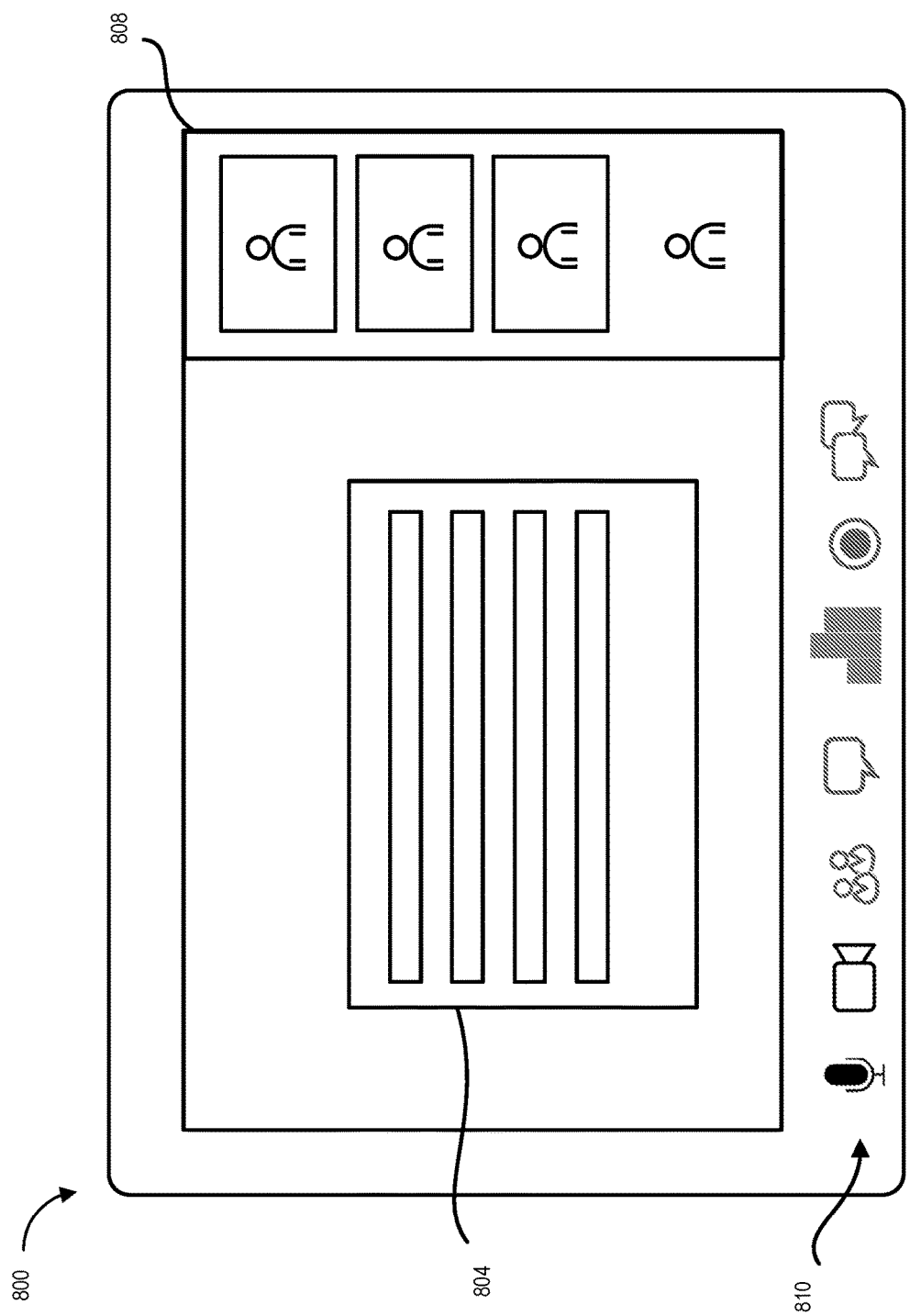
FIG. 8 depicts an example of a Graphical User Interface (GUI) of a video conference in which content is being viewed.

Content items can be presented before the meeting (e.g., while users are in a waiting room), during the meeting, and/or after the meeting. For instance, identified content can be presented in the waiting room. Sharing can involve a user being presented a pop-up overlay screen to view the content item. FIG. 8 depicts an example of such sharing.

FIG. 8 depicts an example of a Graphical User Interface (GUI) of a video conference in which content is being viewed. GUI 800 can be used on any client device. GUI 800 depicts content pane 804, indication 808, and conference controls 810. Content pane 804 shows the content by identified by content application 312 and/or machine-learning model 314. In some cases, the content pane 804 overlays on top of a currently-selected participant.

In some cases, method 500 can continue while the meeting is in progress. Additional metadata such as chat messages, audio data, etc. can be provided to content application 312 and/or machine-learning model 314. In turn, content application 312 and/or machine-learning model 314 can identify and suggest additional content items as the meeting continues.

Figure 9:
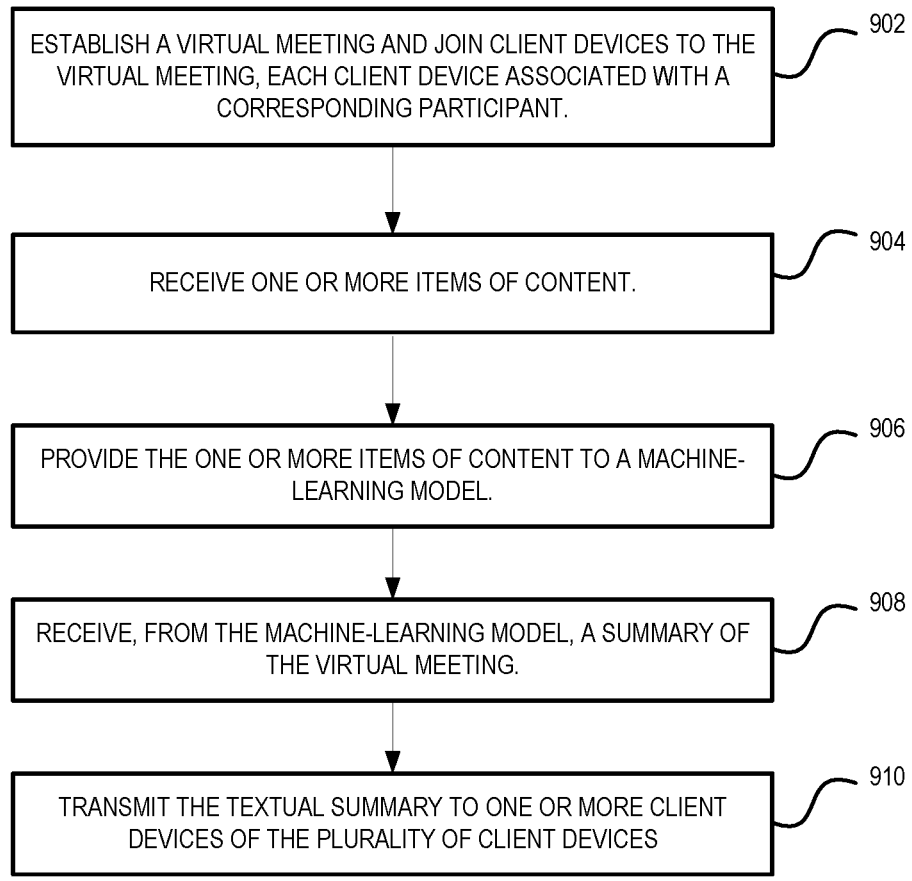
FIG. 9 depicts a flowchart of an example of a method for generating a meeting summary.

In an aspect, meetings can be more useful when a summary of a completed meeting is automatically generated. This summary can be provided to the participants. FIG. 9 is an example of such a process.

FIG. 9 depicts a flowchart of an example of a method 900 for generating a meeting summary. Method 900 can be implemented by client devices 340A-N or by any suitable client devices according to this disclosure. For example purposes, method 900 is discussed with respect to machine-learning model 314B, which is trained to output a meeting summary based on received content from the meeting.

It should be appreciated that method 900 provides a particular method for generating a meeting summary. Other sequences of operations may also be performed according to alternative examples. For example, alternative examples may perform the operations outlined above in a different order. Moreover, the individual operations illustrated by method 900 may include multiple sub-operations that may be performed in various sequences as appropriate to the individual operation. Furthermore, additional operations may be added or removed depending on the particular applications. Further, the operations described in method 900 may be performed by different devices.

At block 902, method 900 involves establishing a virtual meeting and client devices to the virtual meeting, each client device associated with a corresponding participant. For example, video conference provider 310 and starts a meeting. One or more of client devices 330 or 340A-N join the meeting.

At block 904, method 900 involves receiving one or more items of content. For example, content application 312 receives, from one or more of client devices 330 or 340A-N, or data store 316, one or more items of content. Examples of content are audio, video, and chat messages of a meeting and the content shared during a meeting, such as presentations, documents, and multimedia, can all be used to generate items from a summary.

In some cases, content application 312 analyzes the received content and extracts or generates one or more keywords therefrom.

In some cases, textual data is extracted from content, for instance by using optical character recognition. In other cases, when the meeting content includes audio, additional operations can be performed to process the audio. For example, content application 312 receives an audio stream from a client device. Content application 312 can derive one or more snippets of text, including keywords, from the stream. Speech-to-text technology can be used.

In an aspect, a separate machine-learning model 314A-N, e.g., machine-learning model 314C, can be trained to perform speech to text.

In some cases, content application 312 analyzes video streams. For instance, audio can be extracted from a video stream. Content application 312 can receive a video stream, extract audio from the video stream, and then process the audio to identify keywords.

In yet other cases, content application 312 can access a video stream and capture text from one or more frames within the video stream. For example, optical character recognition can be performed on one or more frames of video to extract text. Then, content application 312 can derive one or more keywords from the extracted text.

In some cases, meeting content is received as it is generated, e.g., in real time, during the meeting. In other cases, the meeting has ended before block 904. In that case, the meeting content is received after the meeting.

At block 906, method 900 involves providing the one or more items of content to a machine-learning model. Continuing the example, content application 312 provides the items of content to machine-learning model 314B.

In some cases, keywords or other data extracted from the content, for example, by content application 312, is also provided to the machine-learning model. In some cases, the keywords or other data is provided to the model without the content.

At block 908, method 900 involves receiving, from the machine-learning model, a summary of the virtual meeting. Continuing the example, machine-learning model 314B outputs a summary of the meeting. An example of a meeting summary is shown with respect to FIG. 10.

FIG. 10 illustrates an example of a meeting summary 1000. As depicted, meeting summary 1000 includes title 1010, date and time 1020, participants 1030, topics discussed 1040, and next steps 1050. However, other fields are possible.

Title 1010 depicts the title of the meeting. Date and time 1020 includes the date and time that the meeting took place, and optionally includes the relevant time zone(s) of participants. Participants 1030 includes a list of participants from the meeting and optionally includes their titles, email addresses, and/or phone numbers.

Topics discussed 1040 includes the topics discussed during the meeting. For instance, as depicted, two topics are shown. Different numbers of topics are possible. In some cases, sub-topics can be included.

Next steps 1050 includes any next steps and follow-up items to be completed after the meeting. For instance, the meeting moderator may have committed to follow up with one or more of the participants. Other fields are possible.

In some cases, meeting summary 1000 can include images, video, multimedia, or links. For instance, if a particular document or slide was determined to be especially relevant to the meeting, then content application 312 can place a copy of the document or slide into the summary 1000.

Returning to FIG. 9, at block 910, method 900 involves transmitting the summary to one or more client devices. Content application 312 can cause the summary to be emailed or otherwise transmitted to one or more client devices 330 or 340A-N. In some cases, the summary can be available online and/or provided with any recording of the meeting.

Figure 11:
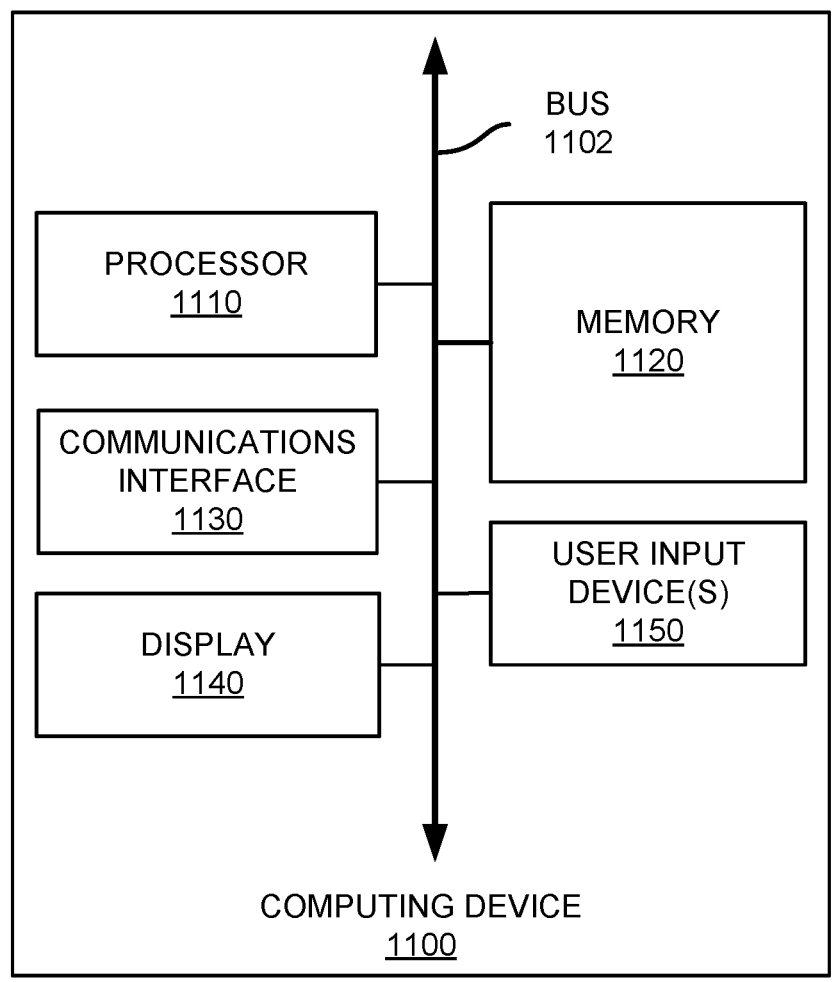
FIG. 11 illustrates an example computing device for identifying relevant content for videoconferences.

FIG. 11 illustrates an example computing device for managing content for videoconferences. Computing device 1100 is suitable for use in example systems or methods described herein, including methods 500 and 900. Computing device 1100 includes a processor 1110 which is in communication with the memory 1120 and other components of the computing device 1100 using one or more communications buses 1102.

The processor 1110 is configured to execute processor-executable instructions stored in the memory 1120 to perform one or more methods described herein, such as part or all of the method, described above. The computing device, in this example, also includes one or more user input devices 1150, such as a keyboard, mouse, touchscreen, video input device (e.g., one or more cameras), microphone, etc., to accept user input. The computing device 1100 also includes a display 1140 to provide visual output to a user.

The computing device 1100 also includes a communications interface 1130. In some examples, the communications interface 1130 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Illustration 1 is a method including: establishing a virtual meeting and joining a plurality of client devices to the virtual meeting, each client device associated with a corresponding participant; accessing a data store having a plurality of available multimedia content items; selecting, based on metadata associated with the virtual meeting, from the plurality of multimedia content items in the data store, a multimedia content item that is relevant to the virtual meeting; and transmitting the selected multimedia content item to one or more of the plurality of client devices.

Illustration 2 is the method of any previous or subsequent illustration, wherein the metadata includes one or more of: information regarding the client devices, identities of the participants, or a meeting type.

Illustration 3 is the method of any previous or subsequent illustration, further including receiving one or more keywords and wherein the selecting is based on the one or more keywords.

Illustration 4 is the method of any previous or subsequent illustration, wherein the selecting further includes: providing the keywords to a machine-learning model; and receiving, from the machine-learning model, an identification of the content item.

Illustration 5 is the method of any previous or subsequent illustration, further including: receiving a request, from a client device of the plurality of client devices, to join the virtual meeting; joining the client device to the virtual meeting; and presenting the selected multimedia content item to the client device.

Illustration 6 is the method of any previous or subsequent illustration, wherein the virtual meeting includes an associated waiting room, and wherein presenting the selected multimedia content item includes presenting the selected multimedia content item in the waiting room.

Illustration 7 is the method of any previous or subsequent illustration, further including: presenting, on a user interface, an indication of the selected multimedia content item; and receiving, from the user interface, an approval, and wherein transmitting the selected multimedia content item is performed based on receiving the approval.

Illustration 8 is the method of any previous or subsequent illustration, wherein providing the multimedia content includes providing a video or audio stream associated with the selected multimedia content item.

The above examples may be implemented on a system including a processor and/or on a non-transitory computer-readable medium. These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

That which is claimed is:

1. A method comprising:
   establishing a virtual meeting and joining a plurality of client devices to the virtual meeting, each client device associated with a corresponding participant, the virtual meeting involving exchanging video or audio streams between the plurality of client devices;
   accessing a data store having a plurality of available multimedia content items;
   selecting, based on content transmitted during the virtual meeting, from the plurality of multimedia content items in the data store, a multimedia content item that is relevant to the virtual meeting;
   transmitting an identification of the selected multimedia content item to a client device associated with a host of the virtual meeting; and
   in response to receiving an approval of the selected multimedia content item, transmitting the selected multimedia content item to one or more of the plurality of client devices.

2. The method of claim 1, wherein the selecting is further based on metadata associated with the virtual meeting, wherein the metadata includes one or more of: information regarding the client devices, identities of the participants, or a meeting type.

3. The method of claim 1, further comprising receiving one or more keywords and wherein the selecting is based on the one or more keywords.

4. The method of claim 3, wherein the selecting further comprises:
   providing the keywords to a machine-learning model; and
   receiving, from the machine-learning model, an identification of the content item.

5. The method of claim 1, further comprising:
   receiving a request, from a client device of the plurality of client devices, to join the virtual meeting;
   joining the client device to the virtual meeting; and
   presenting the selected multimedia content item to the client device.

6. The method of claim 5, wherein the virtual meeting comprises an associated waiting room, and wherein presenting the selected multimedia content item comprises presenting the selected multimedia content item in the waiting room.

7. The method of claim 1, further comprising:
   presenting, on a user interface, an indication of the selected multimedia content item; and receiving, from the user interface, an approval, and wherein transmitting the selected multimedia content item is performed based on receiving the approval.

8. The method of claim 1, wherein providing the multimedia content comprises providing a video or audio stream associated with the selected multimedia content item.

9. A system comprising:
a non-transitory computer-readable medium storing processor-executable program instructions; and
one or more processors communicatively coupled to the non-transitory computer-readable medium, the one or more processors configured to execute processor-executable instructions stored in the non-transitory computer-readable medium to:
establish a virtual meeting and joining a plurality of client devices to the virtual meeting, each client device associated with a corresponding participant, the virtual meeting involving exchanging video or audio streams between the plurality of client devices;
access a data store having a plurality of available multimedia content items;
select, based on content transmitted during the virtual meeting, from the plurality of multimedia content items in the data store, a multimedia content item that is relevant to the virtual meeting;
transmit an identification of the selected multimedia content item to a client device associated with a host of the virtual meeting; and
in response to receiving an approval of the selected multimedia content item, transmit the selected multimedia content item to one or more of the plurality of client devices.

10. The system of claim 9, wherein the selecting is further based on metadata associated with the virtual meeting, wherein the metadata includes one or more of: information regarding the client devices, identities of the participants, or a meeting type.

11. The system of claim 9, wherein the one or more processors are configured to execute further processor executable instructions configured to cause the one or more processors to receive one or more keywords and wherein the selecting is based on the one or more keywords.

12. The system of claim 11, wherein the one or more processors are configured to execute further processor executable instructions configured to cause the one or more processors to:
provide the keywords to a machine-learning model; and
receive, from the machine-learning model, an identification of the content item.

13. The system of claim 9, wherein the one or more processors are configured to execute further processor executable instructions configured to cause the one or more processors to:
receiving a request, from a client device of the plurality of client devices, to join the virtual meeting;
joining the client device to the virtual meeting; and
presenting the selected multimedia content item to the client device.

14. The system of claim 9, wherein the virtual meeting comprises an associated waiting room, and wherein the one or more processors are configured to execute further processor executable instructions configured to cause the one or more processors to present the selected multimedia content item in the waiting room.

15. The system of claim 9, wherein the one or more processors are configured to execute further processor executable instructions configured to cause the one or more processors to:
present, on a user interface, an indication of the selected multimedia content item; and
receive, from the user interface, an approval, and wherein transmitting the selected multimedia content item is performed based on receiving the approval.

16. A non-transitory computer-readable medium comprising computer-executable instructions configured to cause one or more processors to:
establish a virtual meeting and joining a plurality of client devices to the virtual meeting, each client device associated with a corresponding participant, the virtual meeting involving exchanging video or audio streams between the plurality of client devices;
access a data store having a plurality of available multimedia content items;
select, based on content transmitted during the virtual meeting, from the plurality of multimedia content items in the data store, a multimedia content item that is relevant to the virtual meeting;
transmit an identification of the selected multimedia content item to a client device associated with a host of the virtual meeting; and
in response to receiving an approval of the selected multimedia content item, transmit the selected multimedia content item to one or more of the plurality of client devices.

17. The non-transitory computer-readable medium of claim 16, wherein the selecting is further based on metadata associated with the virtual meeting, wherein the metadata includes one or more of: information regarding the client devices, identities of the participants, or a meeting type.

18. The non-transitory computer-readable medium of claim 16, further comprising processor-executable instructions configured to cause the one or more processors to receive one or more keywords and wherein the selecting is based on the one or more keywords.

19. The non-transitory computer-readable medium of claim 16, further comprising processor-executable instructions configured to cause the one or more processors to:
receive a request, from a client device of the plurality of client devices, to join the virtual meeting;
join the client device to the virtual meeting; and
present the selected multimedia content item to the client device.

20. The non-transitory computer-readable medium of claim 16, further comprising processor-executable instructions configured to cause the one or more processors to:
present, on a user interface, an indication of the selected multimedia content item; and
receive, from the user interface, an approval, and wherein transmitting the selected multimedia content item is performed based on receiving the approval.

* * * * *